United States Patent
Giacomantonio (10) Patent No.: US 8,516,743 B1
(45) Date of Patent: Aug. 27, 2013

(54) ROTATING AQUAPONIC VERTICAL GARDEN USING A STRETCHABLE GROW MEDIA

(75) Inventor: Paul J. Giacomantonio, Half Moon Bay, CA (US)

(73) Assignee: Inka Biospheric Systems, Half Moon Bay (*) Notice: Subject to any disclaimer, the term of this patent is extended or adjusted under 35 U.S.C. 154(b) by 288 days.

(21) Appl. No.: 12/792,701

(22) Filed: Jun. 2, 2010

Related U.S. Application Data (63) Continuation-in-part of application No. 12/403,939, filed on Mar. 13, 2009, now Pat. No. 8,181,391.

(60) Provisional application No. 61/069,447, filed on Mar. 14, 2008.

(51) Int. Cl.
*A01G 31/00* (2006.01)

(52) U.S. Cl.
USPC .............................. 47/62 A; 47/62 R; 47/62 N (58) Field of Classification Search
USPC ................. 47/59 R, 64, 61, 59 S, 62 R, 62 A, 47/62 N, 63, 65.5, 65.7, 65.8, 65.9, 66.6, 47/67, 39, 66.7, 79, 80, 81, 82, 83, 86, 87, 47/56, 57.6, 1.01 R
See application file for complete search history.

(56) References Cited

U.S. PATENT DOCUMENTS

| | | | |
|---|---|---|---|
| 2,747,331 A | 5/1956 | Steiner | |
| 3,537,687 A | 11/1970 | Adelman | |
| 3,866,352 A | 2/1975 | Herveling et al. | |
| 3,882,634 A * | 5/1975 | Dedolph | 47/65 |
| 3,909,978 A * | 10/1975 | Fleming | 47/82 |
| 4,038,779 A | 8/1977 | Roberts, Jr. et al. | |
| 4,250,666 A * | 2/1981 | Rakestraw | 47/83 |
| 4,258,501 A * | 3/1981 | Brown | 47/16 |
| 4,295,296 A | 10/1981 | Kinghorn | |
| 4,379,375 A | 4/1983 | Eisenberg et al. | |
| 4,399,634 A | 8/1983 | O'Hare | |
| 4,407,092 A | 10/1983 | Ware | |
| 4,584,791 A | 4/1986 | Wolf | |

(Continued)

OTHER PUBLICATIONS

U.S. Appl. No. 12/792,696; Non-Final Office Action dated Oct. 1, 2012; pp. 1-9.

(Continued)

*Primary Examiner* — T. Nguyen
(74) *Attorney, Agent, or Firm* — Dergosits & Noah LLP; Geoffrey T. Staniford (57) ABSTRACT

Embodiments of a vertical rotating garden using a grow media wrapped cylindrically around a column and oriented vertically above a reservoir are described. A motor is connected to the column and rotates the grow media around the axis of the column so that plants growing out of the media are exposed to different sunlight and environmental conditions. The grow media comprises a vinyl-based, non-permeable, ultraviolet blocking backing layer, an activated carbon filter layer attached to the backing layer, one or more capillary biomats attached to the filter layer that physically support the growth of one or more varieties of plants and distribute water to the roots of the plants through capillary action through the area of the grow media, and an optional front panel layer attached to one of the capillary biomat layers, the front panel layer comprising a porous structure made of polypropylene configured to support the plants growing in a direction substantially perpendicular to the plane the front panel surface.

17 Claims, 11 Drawing Sheets

(56) References Cited

U.S. PATENT DOCUMENTS

| | | | |
|---|---|---|---|
| 4,593,490 A | 6/1986 | Bodine | |
| 4,676,023 A | 6/1987 | Mori | |
| 4,765,092 A * | 8/1988 | Cline | 47/61 |
| 4,908,985 A | 3/1990 | Dowell | |
| 4,986,027 A * | 1/1991 | Harvey | 47/59 R |
| 5,031,359 A | 7/1991 | Moffett, Jr. | |
| 5,073,401 A | 12/1991 | Mohr | |
| 5,363,594 A | 11/1994 | Davis | |
| 5,390,442 A | 2/1995 | Behrens | |
| 5,394,647 A | 3/1995 | Blackford, Jr. | |
| 5,555,676 A * | 9/1996 | Lund | 47/82 |
| 5,608,989 A | 3/1997 | Behrens | |
| 5,617,673 A * | 4/1997 | Takashima | 47/60 |
| 5,826,375 A | 10/1998 | Black | |
| 6,219,965 B1 | 4/2001 | Ishikawa et al. | |
| 6,240,674 B1 | 6/2001 | Otake et al. | |
| 6,378,246 B1 * | 4/2002 | DeFoor | 47/62 R |
| 6,393,764 B1 | 5/2002 | Smith | |
| 6,397,520 B1 | 6/2002 | Kosinski | |
| 6,604,321 B2 * | 8/2003 | Marchildon | 47/62 R |
| 6,606,823 B1 | 8/2003 | McDonough et al. | |
| 6,676,837 B2 | 1/2004 | Keeton, Jr. | |
| 6,727,091 B2 | 4/2004 | Darlington | |
| 6,827,036 B2 | 12/2004 | Connolly | |
| 6,840,007 B2 * | 1/2005 | Leduc et al. | 47/62 C |
| 7,143,544 B2 | 12/2006 | Roy | |
| 7,168,206 B2 | 1/2007 | Agius | |
| 7,188,451 B2 * | 3/2007 | Marchildon | 47/59 R |
| 7,243,460 B2 | 7/2007 | Darlington | |
| 7,320,752 B2 | 1/2008 | Austin et al. | |
| 7,516,574 B2 * | 4/2009 | Gottlieb et al. | 47/62 R |
| 7,533,493 B2 * | 5/2009 | Brusatore | 47/82 |
| 7,536,827 B2 | 5/2009 | Busch et al. | |
| 7,559,173 B2 * | 7/2009 | Brusatore | 47/82 |
| 7,730,663 B2 * | 6/2010 | Souvlos et al. | 47/62 C |
| 7,984,586 B2 * | 7/2011 | Brusatore | 47/59 R |
| 8,209,905 B2 | 7/2012 | Furumura et al. | |
| 2002/0144461 A1 * | 10/2002 | Marchildon | 47/65.5 |
| 2004/0237396 A1 * | 12/2004 | Castillo | 47/61 |
| 2005/0241231 A1 | 11/2005 | Bissonnette et al. | |
| 2006/0032128 A1 * | 2/2006 | Bryan | 47/62 R |
| 2006/0162252 A1 * | 7/2006 | Lim | 47/59 R |
| 2008/0155894 A1 | 7/2008 | Bissonnette et al. | |
| 2009/0064577 A1 * | 3/2009 | Lee | 47/62 R |
| 2009/0265986 A1 * | 10/2009 | Young | 47/62 R |
| 2010/0236147 A1 | 9/2010 | Brusatore | 47/59 R |
| 2011/0016782 A1 * | 1/2011 | Harder | 47/66.1 |
| 2011/0023358 A1 * | 2/2011 | Marchildon | 47/66.6 |

OTHER PUBLICATIONS

U.S. Appl. No. 12/792,683; Non-Final Office Action dated Oct. 1, 2012; pp. 1-7.

* cited by examiner

ROTATING AQUAPONIC VERTICAL GARDEN USING A STRETCHABLE GROW MEDIA

CROSS-REFERENCE TO RELATED APPLICATIONS

The present application is a Continuation-in-Part of U.S. patent application Ser. No. 12/403,939, filed on Mar. 13, 2009 and entitled "Vertical Aquaponic Micro Farm," which in turn claims the benefit of U.S. Provisional Patent Application No. 61/069,447 entitled "Vertical Aquaponic Micro Farm" and filed on Mar. 14, 2008, both applications of which are hereby incorporated by reference in their entirety. The present invention is related to U.S. patent application Ser. No. 12/792,683, filed on Jun. 2, 2010 and entitled "Grow and Support Media for Vertical Garden Applications."

FIELD

Embodiments of the invention relate generally to food growing systems, and more specifically, to vertical gardens incorporating stretchable grow media and substrate structures.

BACKGROUND

Limited space is often a significant constraint in garden and plant growing applications, especially in urban and inner-city locations. Vertical gardens have been developed as a way of facilitating the growth of ornamental and food plants along building walls, balconies, rooftops and other similar locations. Such vertical gardens can be an effective way to grow a large number of plants in limited space and transform stark building environments into areas of greenery and lush landscapes. Present vertical garden systems, however, suffer from certain disadvantages that limit them from being truly applicable to a wide range of applications.

A vertical garden is basically a framework of plants placed onto the side of a building or a wall. They can be placed indoors or outdoors and in full or partial sun environments, depending on what types of plants are grown. Present vertical gardens are available only in a few limited configurations. The most basic vertical garden consists of a series of bags or containers that hold soil, and that are attached or hung directly on a wall or suspended vertically in a frame or similar structure. Such gardens are basically soil gardens that have been oriented vertically, with plants growing vertically upward from bags or baskets of soil. Soil based vertical gardens may provide some degree of space savings, but they still rely on soil as the growth media. Consequently, they suffer from the disadvantages traditionally associated with soil, that is, they are heavy, bulky, dirty, and inefficient with regard to water use.

Another vertical garden system uses a metal frame with a waterproof backing material (e.g., Polyvinyl Chloride PVC) that is attached directly to a wall or vertical surface. A second material, such as felt or cotton is glued or otherwise attached to the PVC layer and provides a capillary structure for supporting the plants and distributing water. A variation of this type of wall garden is a system that uses particle board with an absorbent filler material that holds water in a certain width (e.g., two to three inches) of material, and which is attached to the hard vertical surface. One disadvantage of these systems is that since they attach directly to the wall surface, a waterproof layer must be provided to eliminate the possibility of wall damage. Another disadvantage of these systems is that because the grow media is directly attached to a hard substrate or waterproof layer, they are limited with respect to configuration and applications on different types of surfaces, or different size surfaces.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

Embodiments are illustrated by way of example and not limitation in the figures of the accompanying drawings, in which like references indicate similar elements.

SUMMARY OF EMBODIMENTS

In an embodiment, a vertical garden or micro farm is designed to support and incorporate a variety of decorative and/or food plants. The system incorporates a biologically active grow mat and filter system and combines a biological filter system with aquaculture, hydroponics, solar, wind, and battery technologies. The vertical garden system is mounted on a vertically oriented pole or cylinder structure that is coupled to a motor. The motor turns the column at a defined rate to allow the plants to be exposed to different sunlight and/or environmental conditions. The rotating garden vertical aquaponic garden represents a self-sustaining micro farm that can be set up in any area with exposure to sunlight and/or wind. It can be used in exterior locations, or interior applications with the addition of appropriate lighting systems. Depending on application, the system uses significantly less water than is required for traditional farming. Water is recycled through the grow media bed (biomatrix) and a biologic filter, which can be inoculated with a culture of nitrifying bacteria in combination with the plant roots. The biomatrix for the grow media comprises a vinyl-based, non-permeable, ultraviolet blocking backing layer, wherein the backing layer has a defined elasticity to facilitate stretching, and an opaque dark color configured to prevent ultraviolet radiation from penetrating a back surface of the backing layer, and to prevent water from penetrating a front surface of the backing layer, an activated carbon filter layer attached to the backing layer, one or more capillary biomats attached to the filter layer that physically support the growth of one or more varieties of plants and distribute water to the roots of the plants through capillary action through the area of the grow media, and an optional front panel layer attached to one of the capillary biomat layers, the front panel layer comprising a porous structure made of polypropylene configured to support the plants growing in a direction substantially perpendicular to the plane the front panel surface. The grow media is provided as a thin lightweight fabric-like media, that can be used in a frame-based vertical garden or attached directly to a vertical surface, or around a cylindrical support structure.

DETAILED DESCRIPTION

Embodiments of grow media and structure for vertical gardens and microfarms are described. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1:
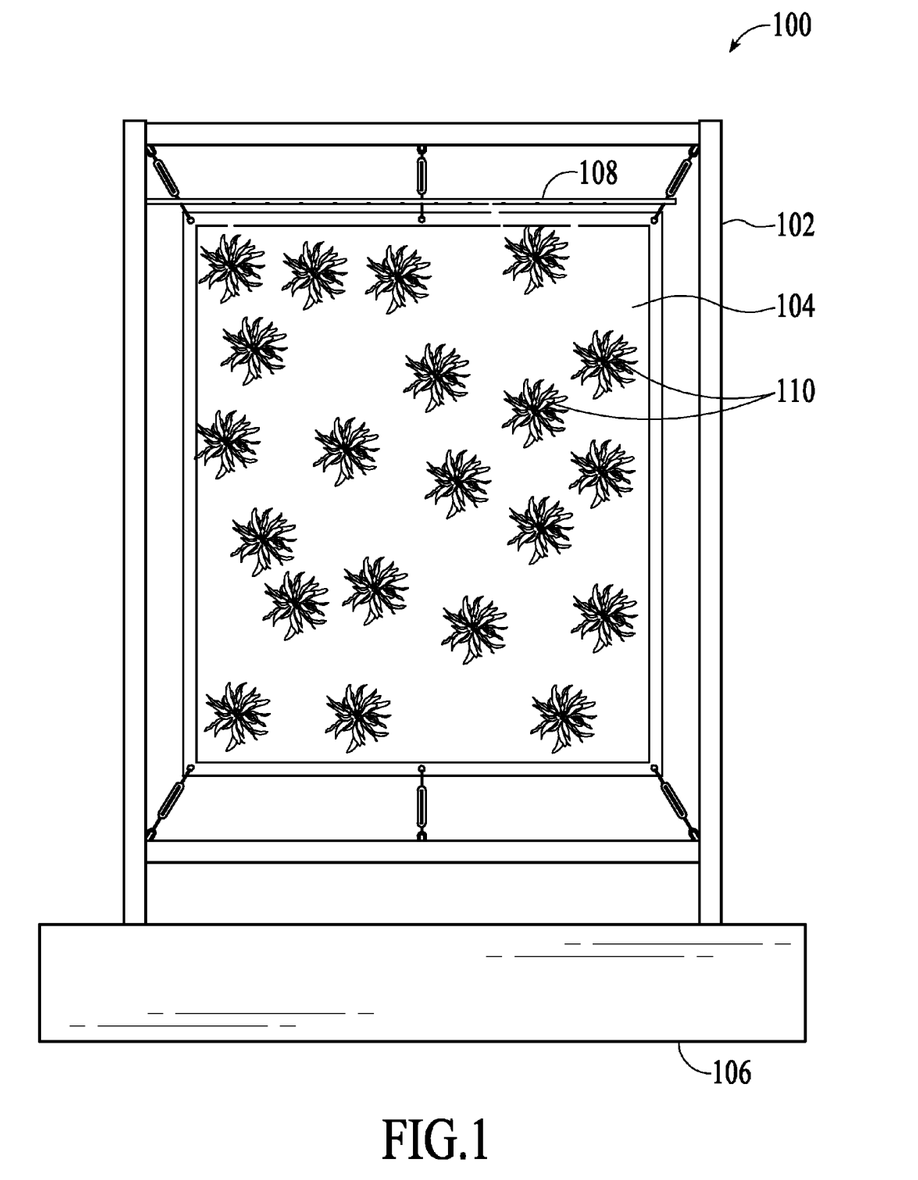
FIG. 1 is a front view of a vertical garden using a biomatrix grow media, according to an embodiment.

FIG. 1 is a front view of a vertical garden using a biomatrix grow media, according to an embodiment. In one embodiment, the vertical garden comprises a substantially rectangular frame structure that supports a multi-layer grow media on which various types of plants are grown. FIG. 1 illustrates a vertical garden structure 100 under cultivation with actively growing plants 110 growing out of a hydroponic garden bio media 104. The grow media 104 is a multilayer fabric assembly that is also referred to as a "biomatrix" or "biomat". The vertical garden frame structure 102 of FIG. 1 is attached to a water reservoir or trough 106 which contains a pump. The pump circulates water back up for distribution through a sprinkler or other water distribution channel 108. The pump may be actuated by a timer that pumps water at certain time intervals or at a certain flow rate depending on environmental conditions and the needs of the plants. As shown, the structure 102 comprises a set of metal tubes that are arranged in a square or rectangular shape. The frame structure 102 may be made of any number of materials, such as steel, aluminum, plastic, wood, bamboo, and carbon fiber, or any other suitable material depending upon cost, location, and environmental factors. The frame structure can be fashioned in many different dimensions and shapes, depending on needs and size constraints. Appropriate power supply leads or generators can be attached to power to the pond pump, timer, and any other electrical components of garden 100.

The vertical garden 100 incorporates a biologically active grow mat and filter system and combines a biological filter system with aquaculture and hydroponics technologies. Centrally positioned in the frame structure 100 is a substantially vertical hydroponic plant growing system. In one embodiment, plants 110 are planted into a series of vertically set, vegetable fiber or food grade fiber bio-mats, which may additionally include activated carbon filtration mats. Alternatively the fiber biomat substrate may be replaced with stones, glass or brick fragments, or any combination thereof.

As shown in FIG. 1, the biomat 104 is a flexible substrate material that is attached to connection points of the frame through cables and connectors. The embodiment of FIG. 1 illustrates a biomat 104 that is attached to the corners of the frame 102 through appropriate cable/connector assemblies. Alternatively, the biomat 104 can be attached to other portions of the frame, such as along the sides of the tubes. In an embodiment, the main backing portion of the biomat is a vinyl layer that can be stretched taut within the frame to orient the grow layers of the biomat in a substantially vertical position within the frame.

In a general implementation, water is recycled through the biomat grow media 104 and a biologic filter, which can be inoculated with a culture of nitrifying bacteria in combination with the plant roots. Water is held within the trough 106 for recycling through the biomat on a periodic basis. In an embodiment fish may be kept in the trough to implement a closed-loop biological hydroponic aquaculture system, as described in related patent application Ser. No. 12/403,939.

The entire structure 100 of FIG. 1 may be set on a steel foundation for added stability. Alternatively, the frame posts may be set in concrete or equivalent foundations for permanent or semi-permanent deployment. In a further alternative embodiment, the frame structure may be placed on casters, wheels or movable pallets for mobile or temporary deployments. An optional light assembly (bulbs or bar) may be attached to the frame to provide light to the plants for use in low-light environments.

Figure 2:
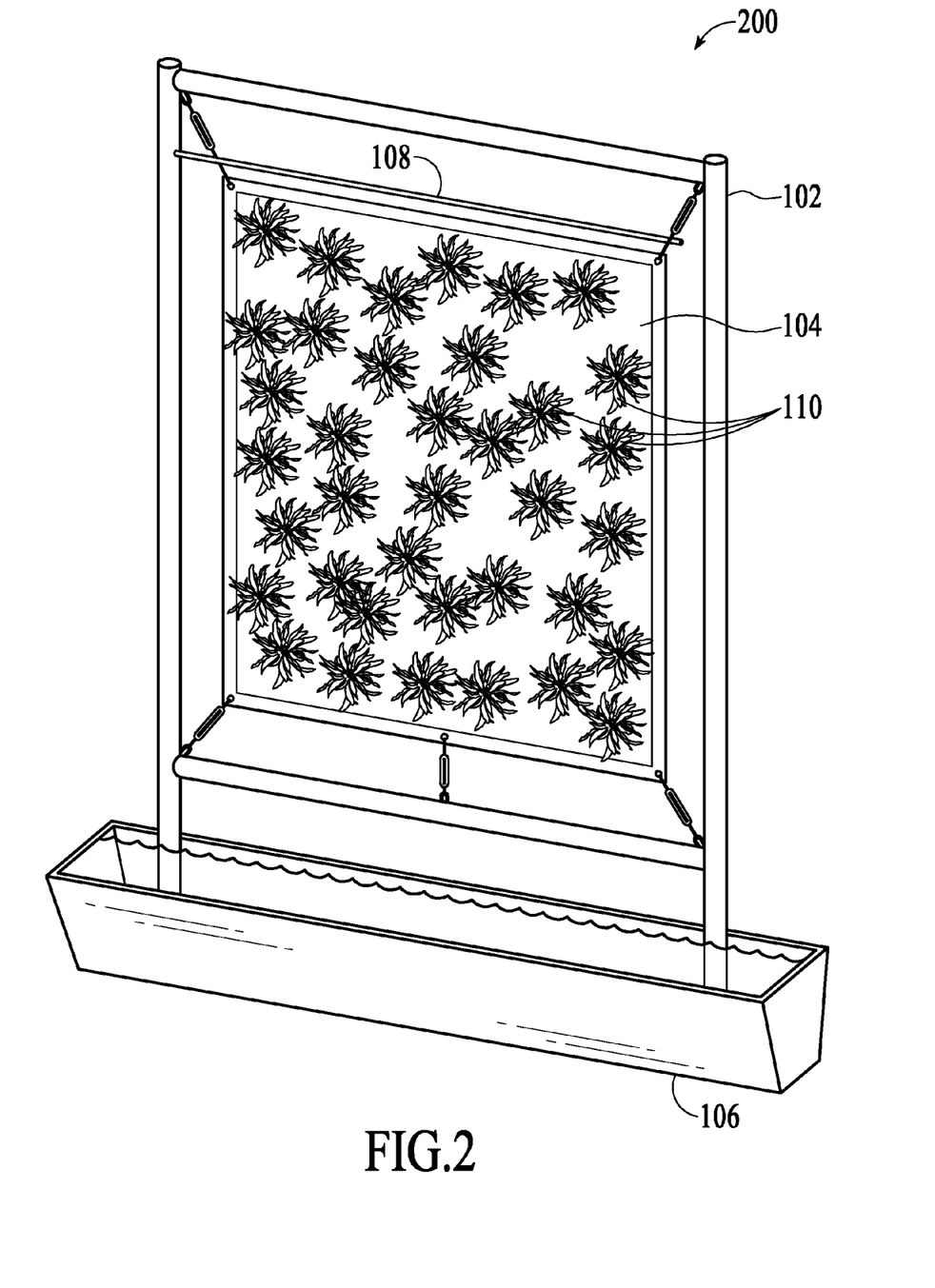
FIG. 2 is a perspective view of the vertical garden of FIG. 1, according to an embodiment.

FIG. 2 is a perspective view of the vertical garden of FIG. 1, according to an embodiment. As shown in FIG. 2, the vertical garden constitutes an appealing structure once it is populated with growing plants. It can be fashioned into virtually any shape and size, and is made of relatively lightweight material to facilitate portability and placement in a wide range of locations. The embodiments of FIGS. 1 and 2 illustrate the biomat hanging from a frame or mounted on a scaffold structure. Such a structure can be used as a standalone vertical garden, or it may be positioned adjacent to, or even integrated as part of a building wall.

Figure 3:
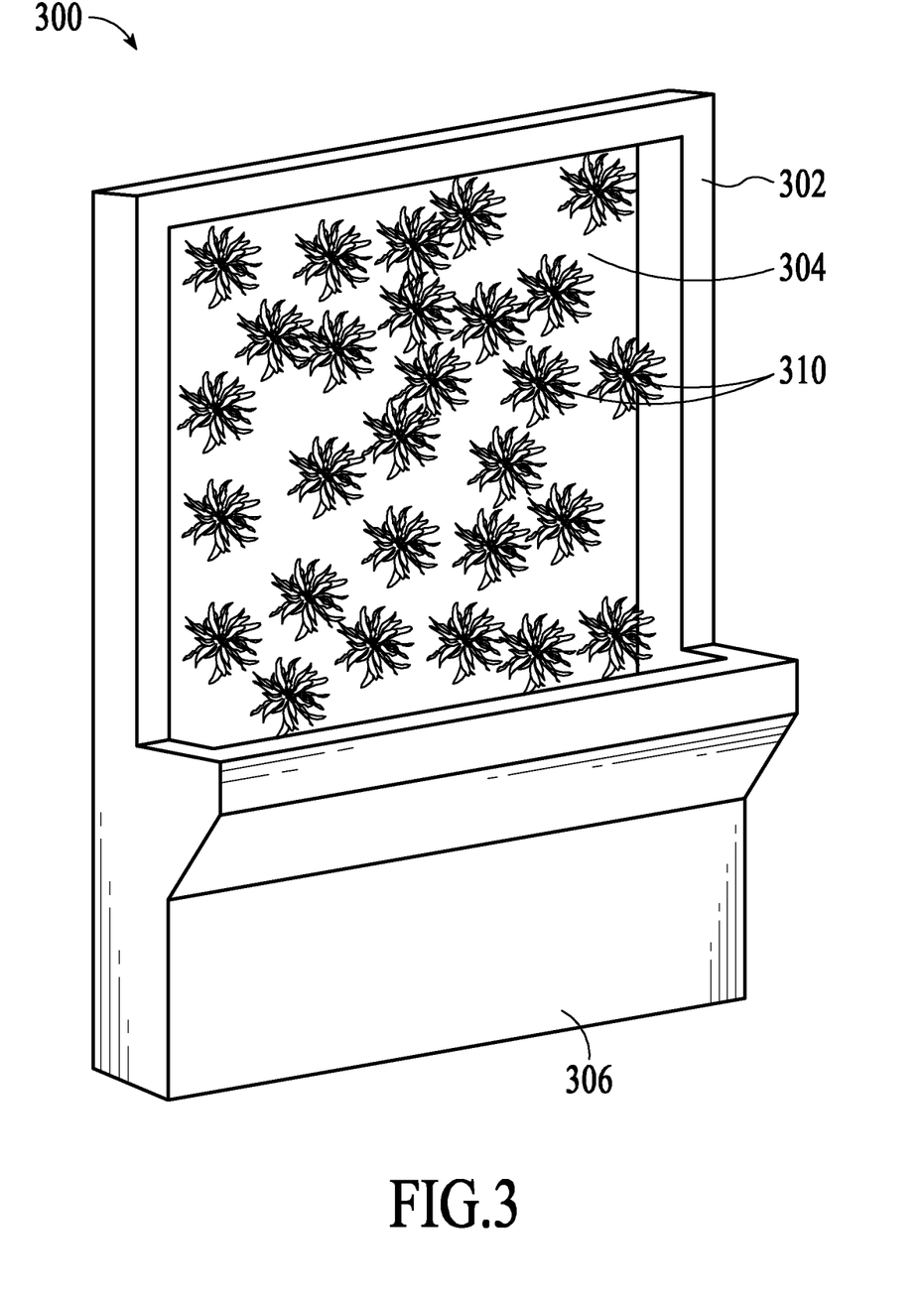
FIG. 3 is a perspective view of a vertical garden using a biomatrix grow media, according to an alternative embodiment.

The vertical garden may be formed into various different shapes and sizes according to particular constraints and needs. It may be embodied in the frame structure of FIG. 1, which may be of a size on the order of 10×12 feet, or similar dimensions, that may be suitable for outdoor or greenhouse environments. Alternatively, it may be embodied in a smaller, more portable structure for inside or small garden environments. As such, the garden structure may be on the order of 3×5 feet, or similar dimensions. In such an embodiment, the garden structure may be formed into an integrated decorative structure that resembles stone or plaster, and that may suitable for indoor or even table-top use. FIG. 3 is a perspective view of a vertical garden using a biomatrix grow media, according to an alternative embodiment. As shown in FIG. 3, the vertical garden 300 comprises a frame structure 302 that integrally includes a water basin 306. The biomatrix 304 is attached to a surface of the frame and supports the growth of plants 310. The garden structure 302 may be made of any appropriate material, such as plaster, cement, stone, plastic, wood, and the like. It may be molded or carved into any shape and size that is suitable for supporting a biomatrix of the desired dimension. In an embodiment, the biomatrix 304 may be attached to a vertical surface of the structure 302. Alternatively, the structure 302 may be formed to include at least a partially open frame, and the biomatrix can be suspended within the frame in a vertical or substantially vertical orientation. The basin 306 holds water and also includes a pump that feeds water back through the biomatrix for periodic and constant irrigation of the biomatrix.

Figure 4:
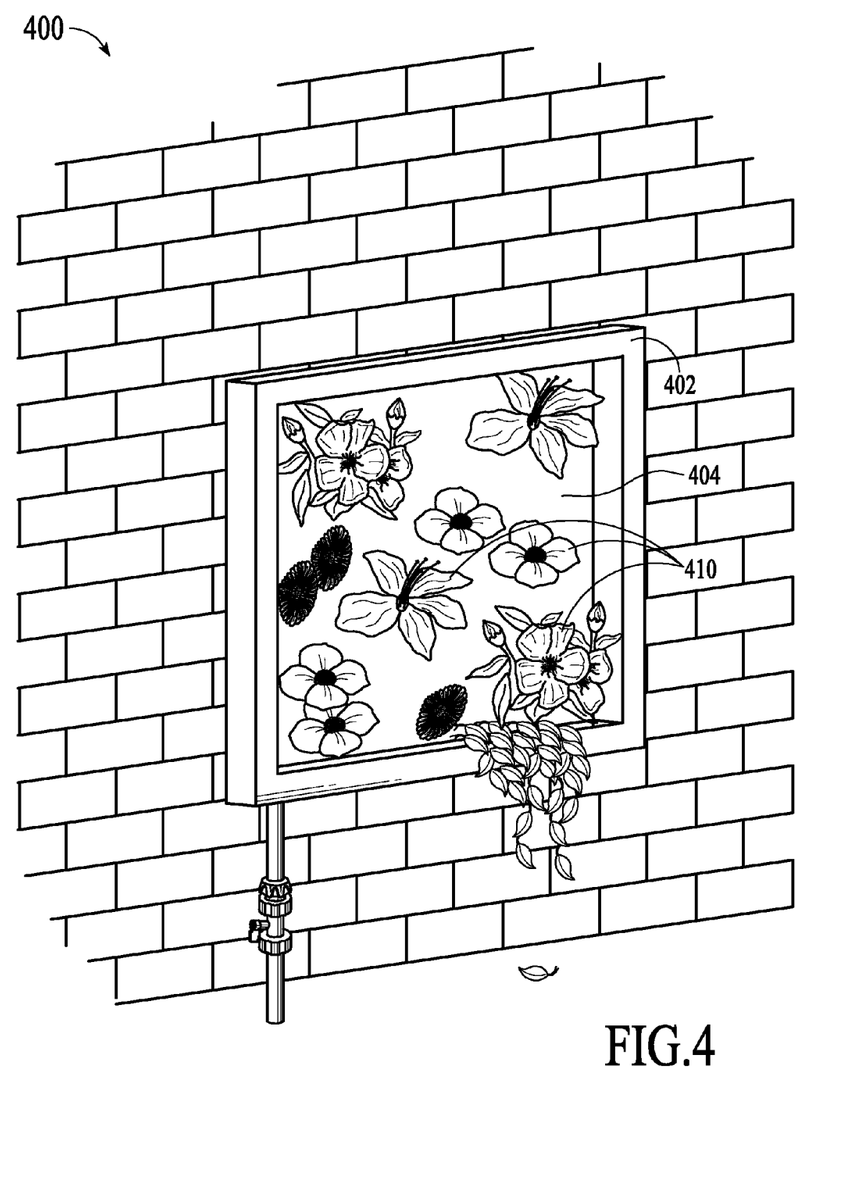
FIG. 4 is a perspective view of a vertical garden attached to the side of a building wall, according to an embodiment.

In one embodiment, the vertical garden may be configured to be mounted on the side of a building wall or other large-scale vertical structure. FIG. 4 is a perspective view of a vertical garden attached to the side of a building wall, according to an embodiment. In this case, the biomatrix grow media 404 is attached directly to a wall surface 402. This allows plants 410 to appear as if they are growing out of the surface of the wall. The biomatrix may be irrigated by external means, such as a hose is used manually or automatically to spray water onto the plants 410 and the biomatrix 404. Alternatively, a separate water trough and pump system (not shown) may be used to provide water to the biomatrix. The biomatrix can be attached to the wall surface by glue, nails, or other appropriate attachment means, depending upon the material of the wall, and the size and shape of the biomatrix.

In an alternative embodiment, the vertical wall garden may be implemented along the surface of a chain link fence, or any other trellis or fence structure. In this case, the fence forms the frame structure, and the biomatrix is attached through tension cables to appropriate spots of the fence. For example, a rectangular sheet of biomatrix may be provided with cables and hooks attached to its four corners. These can then be used to hook the biomatrix along the side of a chain link fence. Cable tensioners can be provided to pull the biomatrix taut, once it is mounted to the fence. In this manner, a vertical garden can quickly and easily be installed in many different urban environments, such as schools and playgrounds.

Many different types of plants can be grown using the biomatrix grow media and the vertical garden structure. Various types of herbs, decorative plants and flowers, and food plants can relatively easily be grown using this system. Generally, plants with standard root systems work best, and many different sizes can be accommodated, while bulb and tuber plants (e.g., potatoes, carrots, turnips, etc.) are not as suitable.

Figure 5:
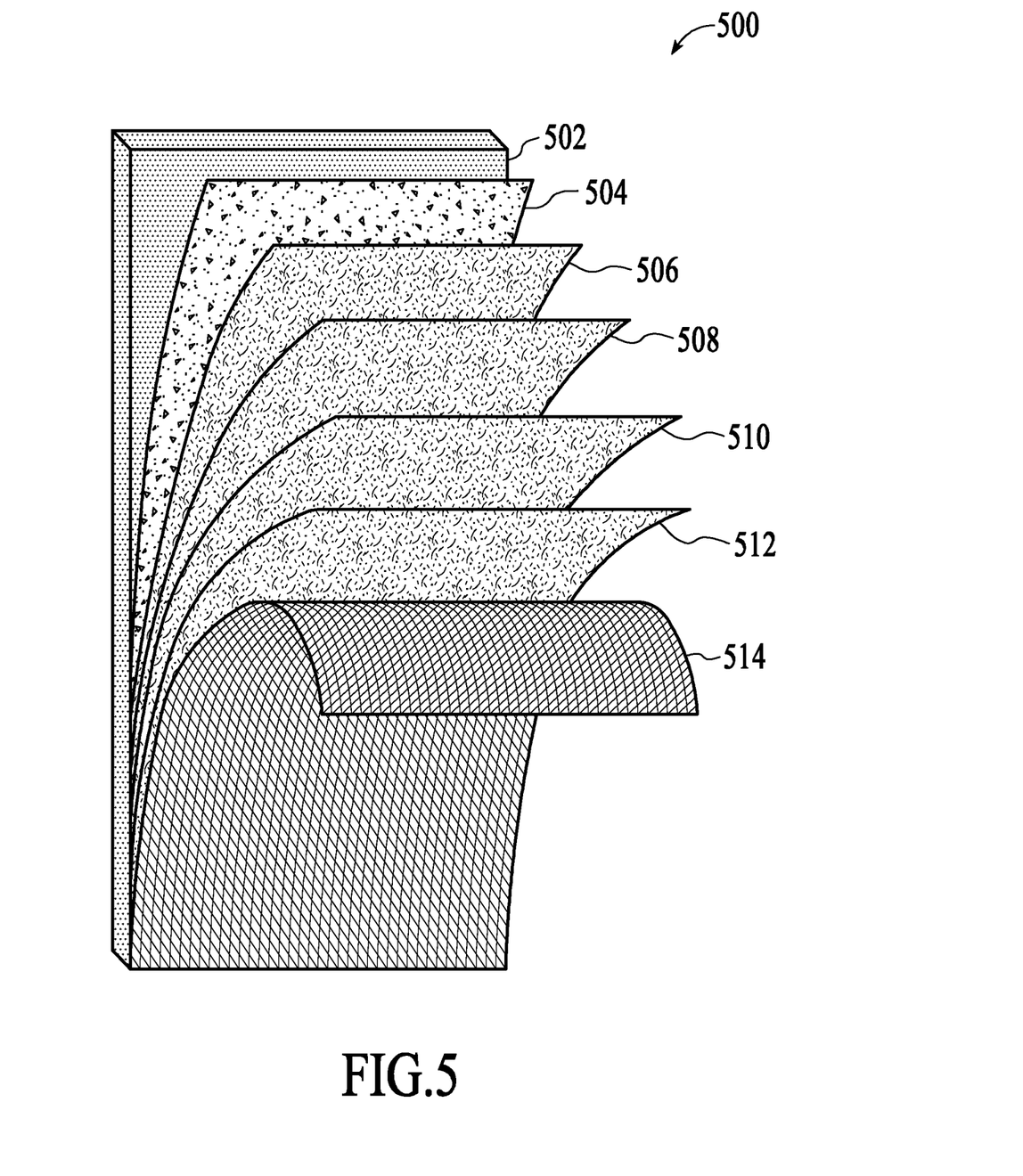
FIG. 5 illustrates the composition of a biomatrix grow media, under an embodiment.

As shown in FIG. 1, a main component of the vertical garden 100 is the flexible biomatrix grow media 104. This is a lightweight, flexible material that is composed several layers joined together to form a composite matrix that supports plants and efficiently distributes water and nutrients. FIG. 5 illustrates the composition of a biomatrix grow media, under an embodiment. The composite biomatrix fabric 500 comprises a main substrate layer 502 which is a waterproof backing material, such as marine-grade vinyl or similar vinyl or PVC material. This layer provides the structural support for the remaining layers of the biomatrix and attaches directly to the frame or wall of the vertical garden. It is an elastic or slightly elastic material that can be stretched by a certain amount to provide tension when deployed in the vertical garden frame or structure. For implementations where the wall garden is attached directly to the surface of a building wall or placed flush against a wall, the backing layer 502 is selected to be impermeable to prevent water from penetrating through and staining or damaging the wall. An active carbon biomat layer 504 is affixed to the backing layer 502. The active biomat layer is essentially an activated carbon filter layer that helps filter the water supply, adds a carbon nutrient for the plant roots and provides a surface area for microorganism colonies that aids in the bio digestion of the nitrogen load in the water supply and helps with filtering hydrocarbons from the air that are breathed in through the plants leaves and xylem by the photosynthesis and evapo-transpiration cycle. In an embodiment, the active carbon layer is formed by sandwiching an amount of charcoal powder or similar carbon material between two permeable layers.

As shown in FIG. 5, the biomatrix grow media 500 includes a number of capillary biomat layers 506-512 that are attached to the active carbon layer 504. The capillary biomat layers comprise thin mesh fabric layers, such as felt, cotton, vegetable fibers, or similar material, that help distribute water across the entire surface area of the biomatrix 500. As water is poured, sprayed or otherwise introduced to the biomatrix, the capillary layer or layers help to evenly distribute the water among the plant roots through wicking and capillary action. The outer layer 514 of the biomatrix 500 is a front panel layer that consists of a bio filter fabric and can be made of polypropylene or similar material. This layer provides the main structural support layer for the plants themselves. It is a relatively stiff, porous layer that allows plants to be inserted perpendicularly through the surface of the material, and supports the main stem or body of the plant when the biomatrix is oriented vertically with respect to the ground. The thickness, porosity, and stiffness of the front panel layer 514 can be selected according to the type of plants that are to be grown in the vertical garden. Essentially a relatively thin front panel layer can be used for small plants, such as herbs, and a thicker and/or stiffer front panel layer can be used for larger or heavier plants. In certain lightweight implementations in which very small and light plants are grown, the polypropylene front panel may be omitted to result in a biomatrix that is very light and thin. In this case, the capillary and filter layers provide the physical support structure for the plants.

The layers of the biomatrix 500 are attached together to form a composite fabric-like material of a thickness on the order of one to two inches thick in total. The layers can be attached to one another through any appropriate means, such as glued, stapled, riveted, or sewn together. For example, in a frame-based vertical garden implementation of approximately 5×8 feet in size, the layers of the biomatrix can be joined by rivets placed every six inches along the edge of the biomatrix. This is just one example of a joining method for the biomatrix, and many other techniques can be used depending on the size, cost, and implementation details of the vertical garden installation.

The biomatrix grow media is a fabric composition that constitutes a combined support, water distribution, and filter system. The biomat and filter layers 502 to 514 are illustrated as a number of separate mat-like components of the same size deployed in a sandwich array. It should be noted, however, that this filter and plant substrate system can be composed of mats and/or filters of any appropriate size, shape and material depending upon configuration and needs. For example, any practical number of capillary biomat layers (e.g., 1-4) may be used, and the active carbon filter layer 502 may be separate or integrated within the one or more capillary mat layers. The capillary biomat layers 506-512 can be built from many different fiber materials and mesh designs. For example, the biomat structures can comprise baskets of stone, glass, charcoal or other locally available substrates.

The biomatrix material 500 features several advantages over present vertical garden media. First, it is thin and lightweight. The thickness of the biomatrix in a typical wall garden implementation is on the order of one-inch thick. The material can be rolled up for ease of transportation and storage. It can be easily deployed in a variety of different frame and wall configurations, as well as portable or movable garden structures. Another advantage is that the biomatrix is pliable and flexible. This allows a degree of stretching, which allows the matrix to be utilized in many different applications, since it can literally be stretched to fit the appropriate area. With a self-contained cable and attachment assembly, the grow media can quickly be mounted virtually anywhere on walls and fences to provide vertical garden installations.

Figure 6:
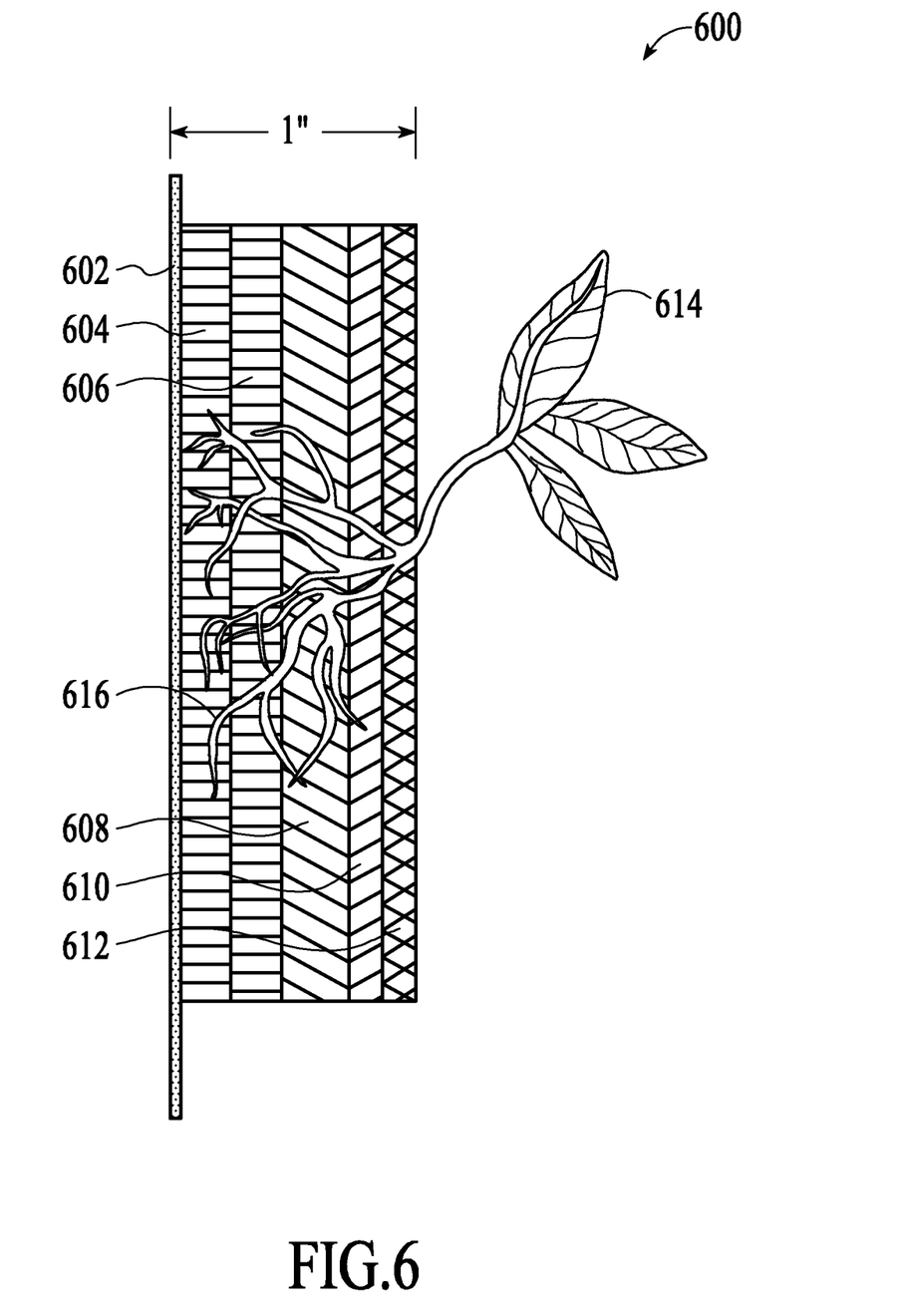
FIG. 6 is a schematic view of a vertical garden and a bio-mat grow media system, under an embodiment.

The biomat and filter structure of the grow media 500 provides a support structure and space for plant roots that grow perpendicularly out of the media. FIG. 6 is a schematic view of a vertical garden and a biomat grow media system, under an embodiment. As shown in FIG. 6, a plant 614 is planted substantially perpendicularly through the front panel 612 and into the capillary 606-610 and the filter layer 604. The plant is held in place by the front panel layer 612, and the roots 616 pass through and grow through the other biomat layers and continue growing into the activated carbon filter layer 604. The biomat assembly is held in place by a biomat holder frame structure or is attached directly to the wall through the waterproof backing material 602.

As shown in FIG. 6, the backing material 602, which is typically a black vinyl layer, constitutes a black background that allows the plants to grow in the proper orientation. In general the plant roots 616 grow into the dark and away from the sunlight that falls on the front layer 612. The impermeable backing layer, which is also a UV block, prevents the roots from penetrating through the back of the biomatrix, and a phenomenon known as "air pruning" prevents the roots from coming back out of the front of the biomatrix. It has been found that the roots grow in small compact circular structures within the filter layer 604 of the biomatrix.

Figure 7:
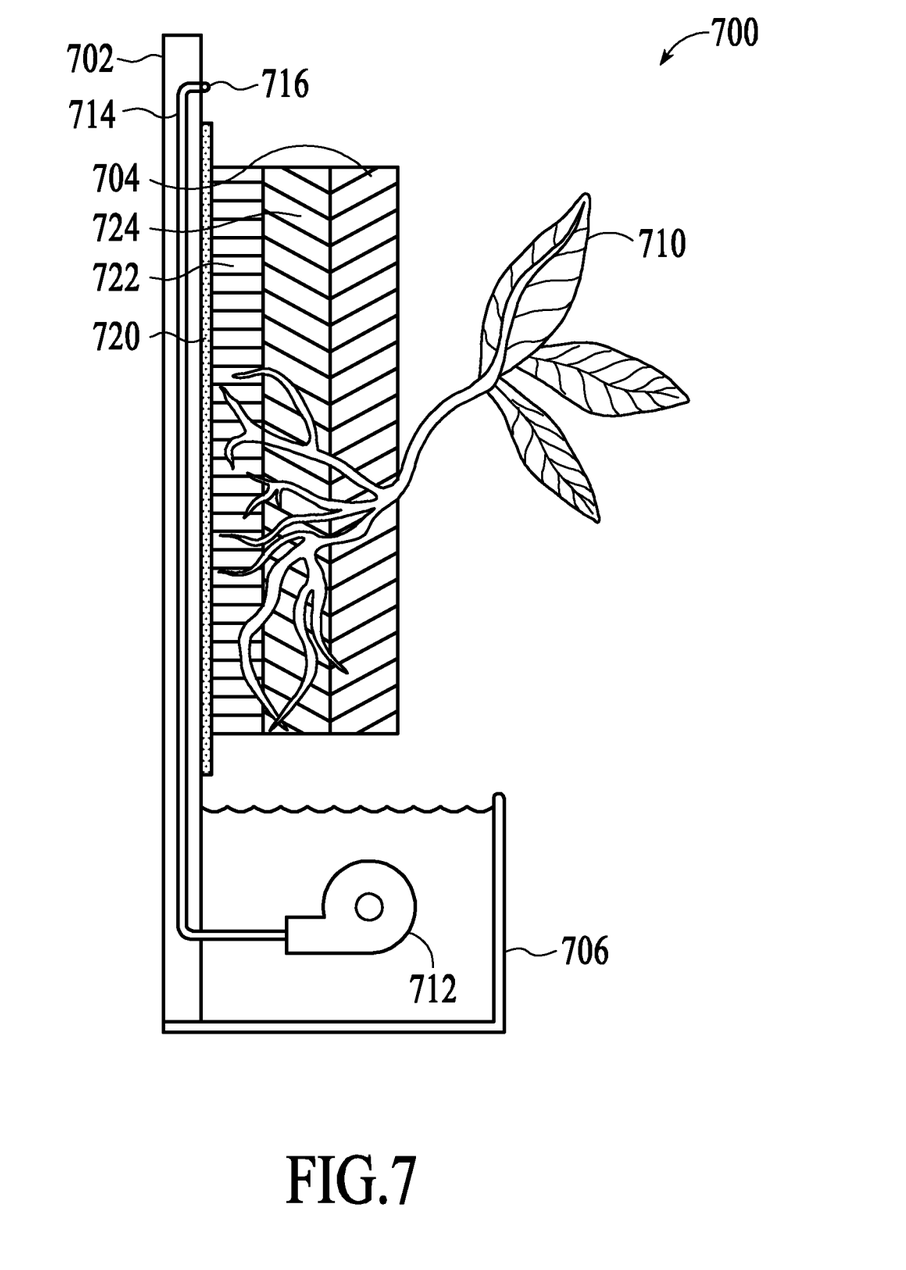
FIG. 7 illustrates the recirculation of water through a pump structure and capillary grow media for a vertical garden, under an embodiment.

In an embodiment, the biomatrix forms an integral part of a vertical garden system that also includes a closed loop water distribution system. This system generally comprises a water reservoir (e.g., a basin, trough or other suitable container), a pump, return pipe, and water distribution pipe, and optionally, an automatic timer. FIG. 7 illustrates the recirculation of water through a pump structure and capillary grow media for a vertical garden, under an embodiment. As shown in FIG. 7, the vertical garden 700 comprises a frame 702 to which is attached the biomatrix grow media 704 that supports plants 710. Water is taken from reservoir 706 by recirculation pump 712 and is fed through tube 714 up to a water return pipe or other water distribution system. For the embodiment of FIG. 7, the water return pipe comprises a section of tubing that runs along a channel 716 that extends across the length of the biomatrix 704. The water is sprayed or dripped out of distribution holes along the length of the tube and permeates a portion of the biomatrix. The biomatrix constitutes a membrane that wicks the water throughout its entire area through the capillary action of the capillary layers. Because of its vertical orientation, excess water is drawn back down through the biomatrix by gravity and back into the water reservoir. In optimal implementations, a timer and appropriate water flow rates are used to minimize excess water use and flowback. Thus, all of the water distributed onto the matrix passes through the activated carbon layer and the vegetable fiber (capillary) biomats and is retained through a water envelope mechanism that uses evapo-transpiration mechanisms. This allows minimal use of water and greatly increases the efficiency of the vertical garden.

Figure 8:
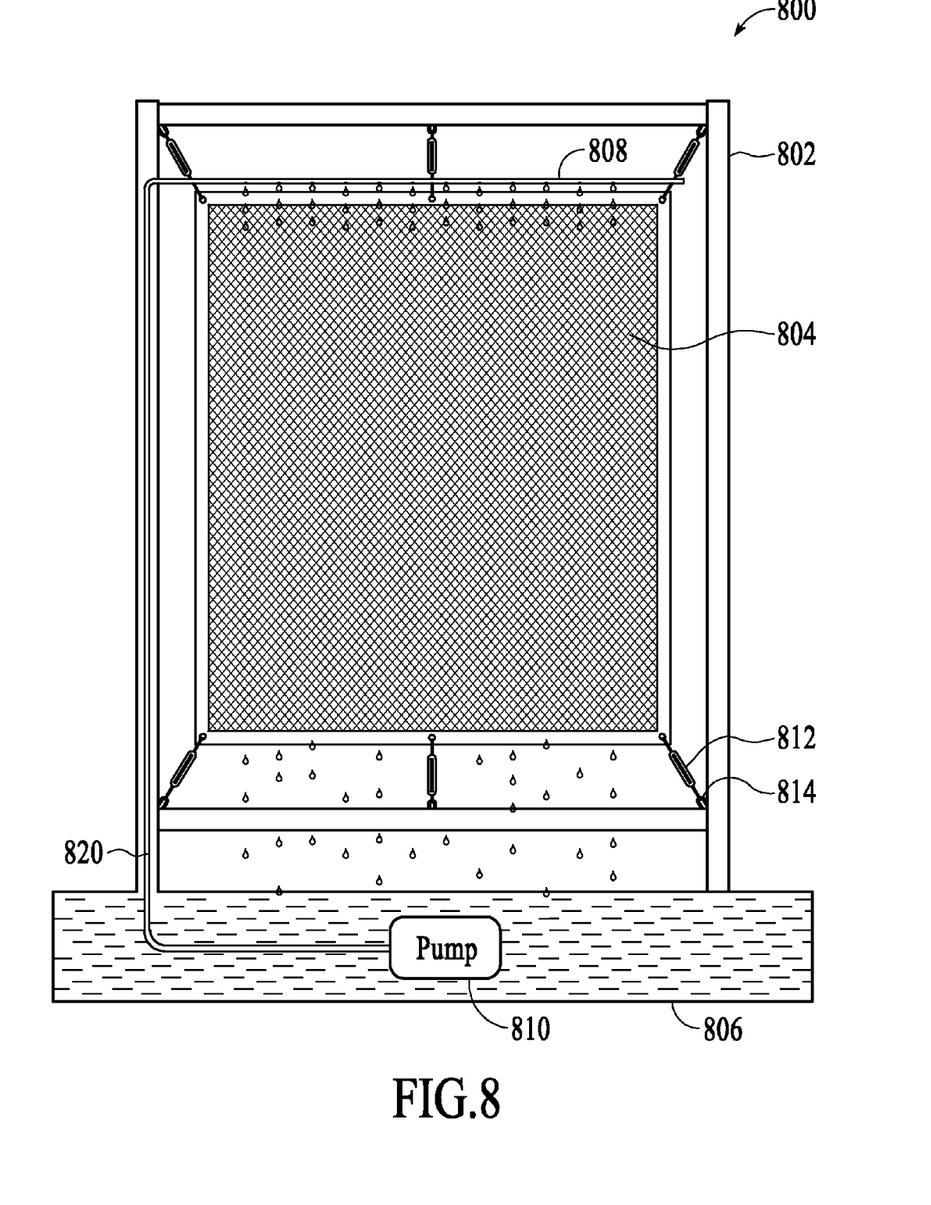
FIG. 8 is a front view of a recirculating water distribution system for a vertical garden under an embodiment.

As shown in FIG. 7, the water redistribution mechanism comprises a pump, return pipe and water distribution tube that is contained in a channel and allows water to basically be drawn through the biomatrix material through capillary action. In an alternative embodiment, a water distribution tube or set of sprinklers may be used to pour water onto the biomatrix. FIG. 8 is a front view of a recirculating water distribution system for a vertical garden under an embodiment. As shown in FIG. 8, the recirculation pump 810 in trough 806 pumps the water back up a plumbing tube 820 to continue the water cycle in a closed loop. Water is fed into an outflow pipe 808, which comprises a pipe with a number of spray holes formed along its length. Water from the outflow pipe 808 drips or flows through these holes onto the biomatrix 804 and is distributed through the biomatrix through the capillary layers. Any excess water then drips back into the water trough 806. The return tube 820 that connects the pump to the outflow pipe 808 may be configured to run within one of the tubes that make up the frame 802 of the vertical garden 800.

Other water return mechanisms may also be used, such as soaker hoses placed adjacent to the biomatrix or water reservoirs that are kept in constant contact with a side or portion of the biomatrix. Other components (not shown) may also be included in the water recirculation system. These include additional plumbing and filtration elements, such as an ultra violet filter/sterilization unit. An upper irrigation reservoir may also be used to hold and drip water onto the biomatrix by gravity feed. In general, the water in system 700 is run on a closed, continuous recirculation loop by means of a pump that is operated by an automated timer that is programmed to run the pump periodically according to a defined timing schedule or continuously at a defined flow rate.

In one embodiment, the capillary biomat layers of the biomatrix may be inoculated with beneficial bacteria (e.g., Nitrosamines and Nitrobacteria) that convert ammonia into nitrite, and then nitrite into nitrate, so that the plants can metabolize. As the water passes through the biomats, effluent and nutrients are metabolized by the plant roots and the beneficial bacteria. In this case, any excess water may be returned to the reservoir clear of materials.

In another embodiment, the water reservoir 806 may comprise a fish pond that contains a number of fish. In this embodiment, the water in the fish pond collects waste from the fish, dead plants, uneaten fish food, and other biological residue. These are passed as part of the nutrient load in the water incorporating ammonia, nitrites, nitrates, and nitrogen. The water and both soluble and solid wastes are sucked up from the floor of the fish pond and recycled through a biological filter system that consists of the filter and capillary biomats on which plants are grown. The bio mats may be inoculated with the beneficial bacteria and nutrients (e.g., nitrobacteria and nitrosamines) for the purpose of breaking down the ammonia and nitrite load in the water and converting components in the effluent into nitrate, a plant food.

The biomatrix may even be provided in the form of fabric sheets that can be used to make tents, awnings, or similar protective or structural fabric structures. In this case, the structural fabric can be used to grow plants as well as provide shelter.

Rotating Garden

In one embodiment, the vertical aquaponic garden using the biomatrix grow media is implemented in a vertical rotating garden embodiment. In this embodiment, the grow media is wrapped cylindrically around a pole or column and oriented vertically above a reservoir. A motor or other rotating means is connected to the column and rotates the grow media around the axis of the column so that plants growing out of the media are exposed to different sunlight and environmental conditions. The rate of rotation can be set depending upon the conditions and needs of the plants.

Figure 9:
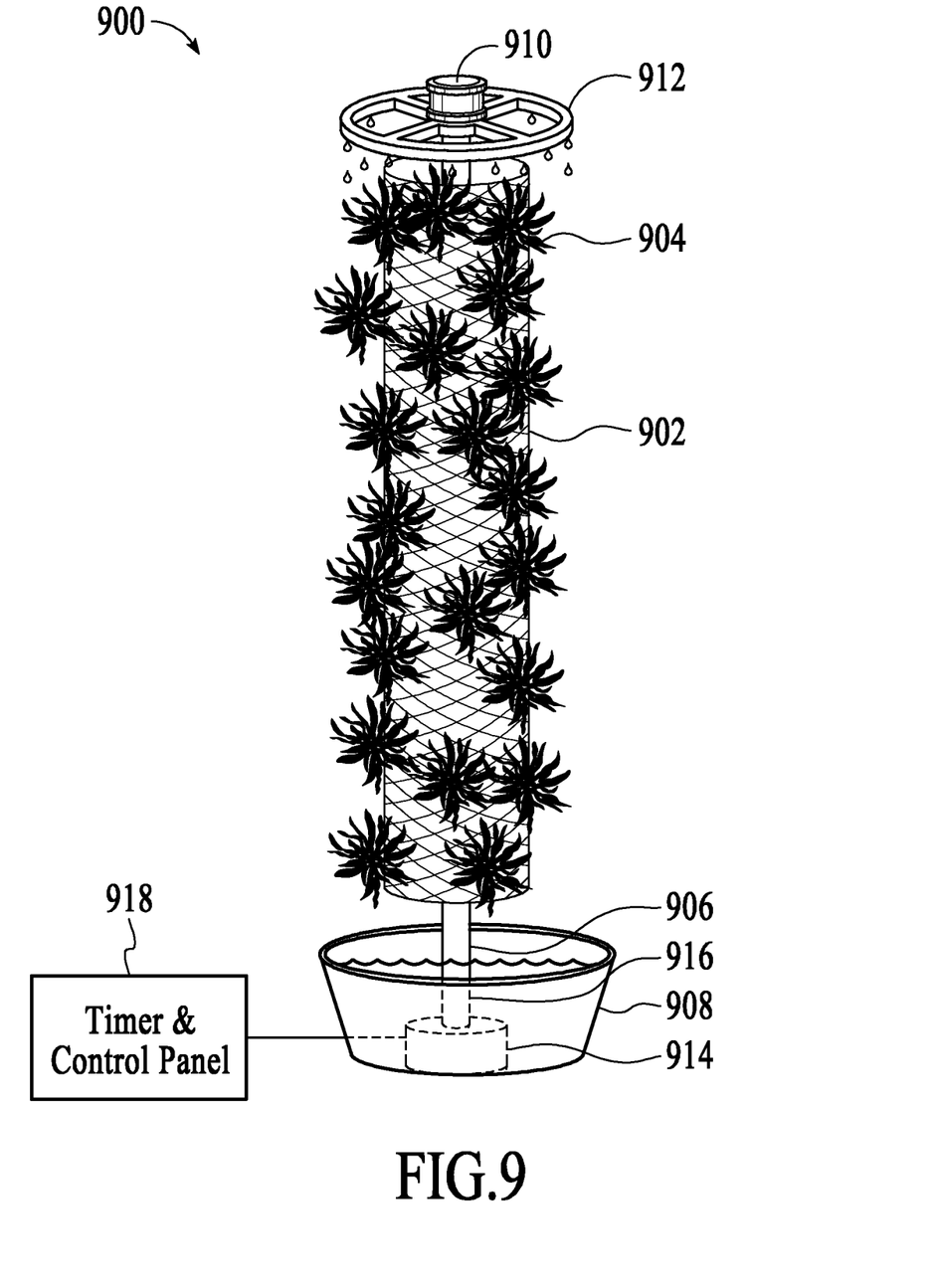
FIG. 9 illustrates a rotating vertical garden system using a biomatrix grow media under an embodiment.

FIG. 9 illustrates a rotating vertical garden system using a biomatrix grow media under an embodiment. As shown in FIG. 9, the rotating garden includes a central column or pole 906 around which is wrapped a section of biomatrix grow media 902. The grow media may be wrapped tightly around the column or wrapped around a cylindrical frame or structure that is connected to the column. The diameter of the column or cylindrical frame is selected so as to allow a sufficient enough surface area for the growth of selected plants 904. The grow media can be attached to the column or cylindrical structure through any appropriate means, such as adhesives, nails, staples, fasteners, and so on. The column 906 is attached to a motor 914 through a motor shaft 916. For the embodiment of FIG. 9, the motor is placed within a reservoir 908 that is positioned beneath the grow media. The reservoir 908 contains a pool of water, which is pumped up through a pipe to a water distribution system 912 that is located at the top of the column 906. The water distribution system may comprise a sprinkler assembly that is held in place through a top cap 910. The sprinkler assembly comprises a number of perforated arms or frame elements that allow for the spraying or sprinkling of water down onto the grow media.

In an embodiment, the motor 914 turns the column at a rate selected by the user. An external timer and control panel 918 may be used to provide input means for parameters such as on/off functions, motor speed, sprinkler and pump operation, and so on. The turn rate of the garden may be selected depending on the position of light relative to the grow media, as well as other environmental factors, such as temperature, wind, shade, and so on.

The rotating vertical garden 900 may be built or configured in many different sizes depending upon the types of plants that are grown, and the areas of usage. It may be configured for use outside of a building such as on a balcony or porch, or it may be provided for use in internal or decorative applications. It may even be built on a relatively small scale for use on tables or other furniture.

The central column 906 of the rotating garden may a solid or hollow pole or shaft of any appropriate diameter, and may be fashioned from many different materials, such as steel, aluminum, wood, bamboo, plastic, carbon fiber, and so on. The column itself may be formed in a size that is sufficient to wrap the grow media around, or it may be a thin shaft that supports a larger diameter column around which is wrapped the grow media. The column may be substantially circular in cross-section, or it may be ovaloid. Alternatively, it may be square, rectangular or other polygonal shape.

The motor and pump unit for the rotating garden 900 of FIG. 9 may be provided as a single unit 914. In this case, the single unit turns the column 906 through the motor shaft 916 and pumps water from the reservoir 908 through a pipe within or outside of the column 906. Alternatively, the motor and pump may be provided as separate units that both reside within the reservoir 908. The motor unit may also be provided as an external unit that drives the column. In this case, it may be provided on the top part 910 of the column or it may drive the column through an external gearing or belt system.

Figure 10:
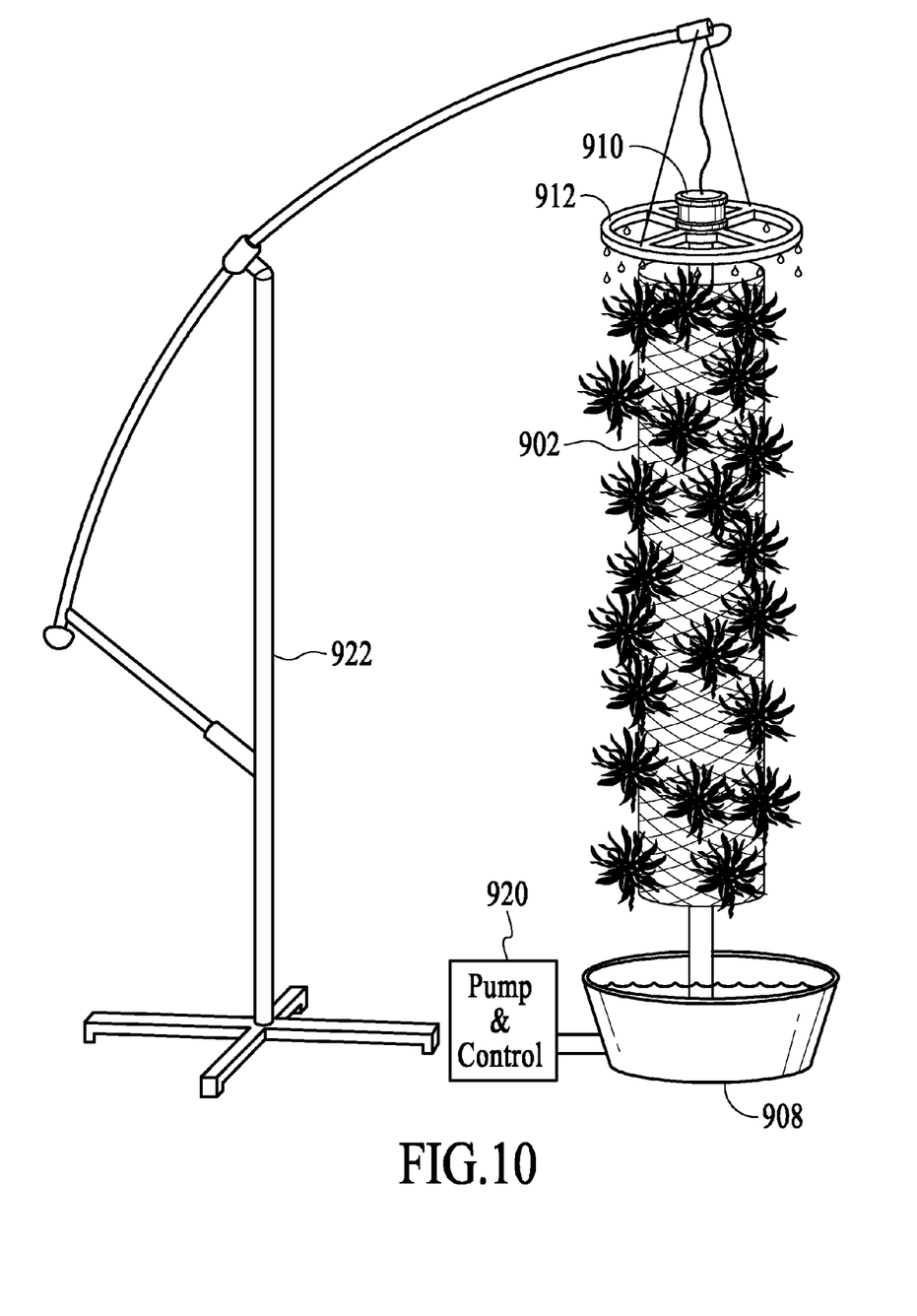
FIG. 10 illustrates a rotating vertical garden system using a biomatrix grow media under an alternative embodiment.

For the embodiment of FIG. 9, the pump and plumbing system that feeds water from the reservoir back to the grow media are provided essentially internal to the reservoir and column assembly. Alternatively, the pump and plumbing system may be external structures. FIG. 10 illustrates a rotating vertical garden system using a biomatrix grow media under such an alternative embodiment. As shown in FIG. 10, the water distribution assembly 912 is positioned above the grow media 902 by a holder assembly or similar frame structure 922. This assembly can also provide the necessary plumbing lines for pump unit 920 to provide water from reservoir 908 for distribution back to the grow media 902. In this case, the motor can be provided either through a bottom mounted motor, as shown in FIG. 9, or it can be provided through a side mounted motor, or a top mounted motor coupled to top cap 910.

The rotating garden embodiment of FIGS. 9 and 10 allow the garden to automatically move in relation to the sun, shade, or other lighting or environmental conditions. A simple slow rotating motor can ensure that all of the plants 904 receive equal exposure to light at all times. Through timer and control means 918, the garden can be programmed or configured to rotate all the time at a set or varying rate, rotate only at certain times of the day or night, or only during certain conditions (e.g., full sun, shade, rain, etc.).

Figure 11:
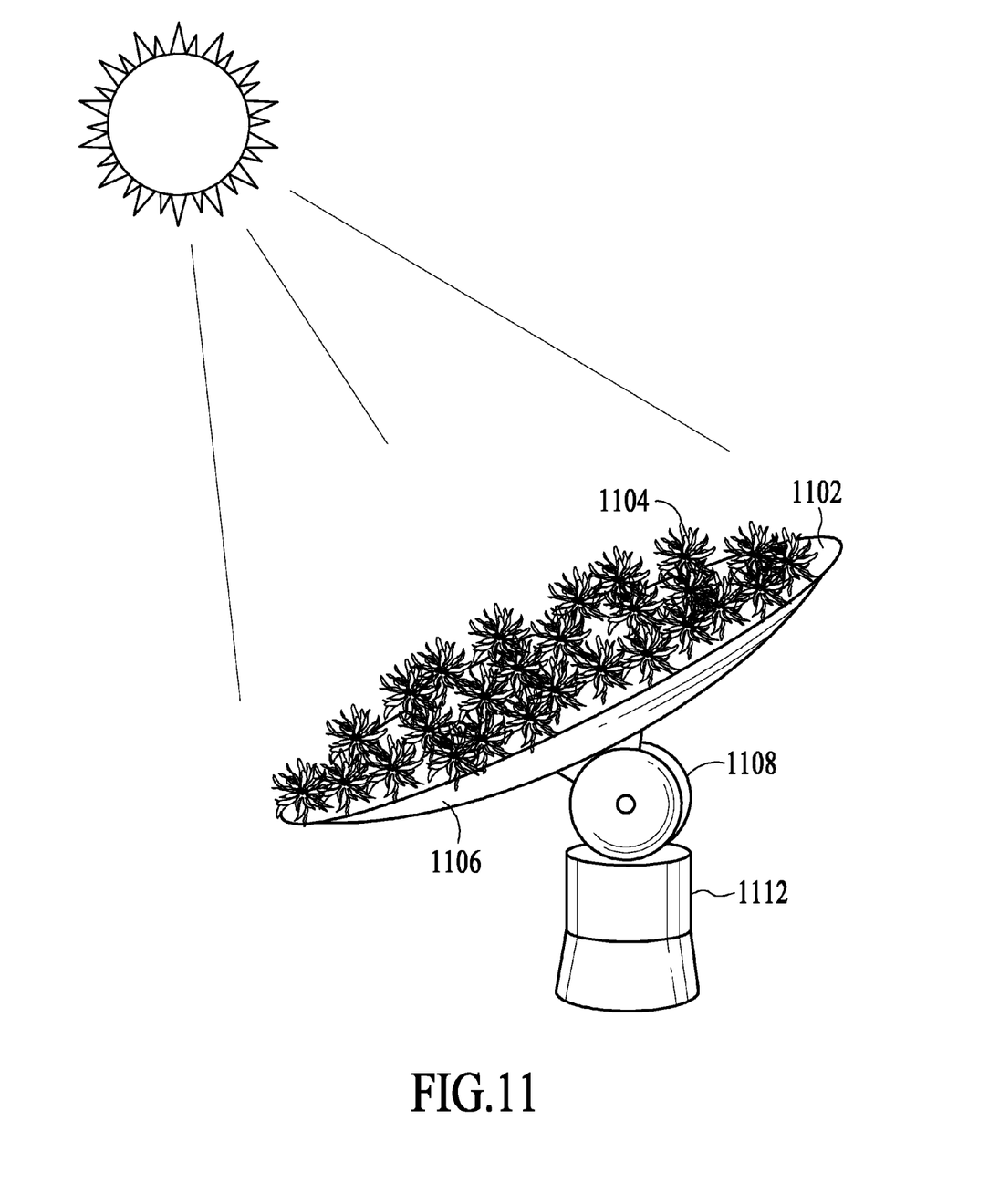
FIG. 11 illustrates a satellite dish based vertical garden system using a biomatrix grow media under an embodiment.

In one embodiment, the grow media garden can be configured to automatically track the sun to provide optimum growing conditions at all times of the day. FIG. 11 illustrates a satellite dish based vertical garden system using a biomatrix grow media under an embodiment. In this embodiment, the grow media 1102 holding plants 1104 is placed within the bowl 1106 of a dish-like, or similar shaped structure. The bowl 1106 moves relative to the base 1112 through pivot assembly 1108. As the sun moves across the sky, the bowl can be moved to track the sun's arc to ensure full exposure of the plants 1104 to the sun throughout the day. Water can be provided to the grow media 1102 through an external hose or sprinkler system, or a separate reservoir and pump assembly similar to that shown in FIG. 10. Control of the angle of the bowl and tracking of the sun may be provided by manual means, or it may be automatically controlled through a light intensity or suntracking system.

For any of the embodiments of the rotating garden of FIGS. 9-11, a system of solar panels and/or wind or water turbines may be incorporated to provide power that replaces or supplements electrical power provided by an energy grid. Such power can be used to drive the pumps, motor, timers, control circuitry and so on, and provides a self-contained system with regard to power generation and use.

In summary, the vertical aquaponic garden according to embodiments allows a form of farming or gardening that is suitable for virtually any size flat or vertical surface. In general, the vertical garden structure comprises a square or rectangular scaffolding or frame support structure. Alternatively, no standalone frame structure may be used and the system may instead be flat mounted on a vertical (wall) or horizontal (ground) surface. For flat farming options, the frame can be placed horizontally rather than vertically and run on a hydroponic growing system. Alternatively, the biomatrix grow media may be installed directly on or above the ground and attached through pegs or other connection means.

Other alternative embodiments of the vertical aquaponic micro farm are possible. For example, it is possible to run the vertical garden system without the aquaculture component FIGS. 7 and 8. In the absence of the aquaculture component, water, as well as nutrients and microorganisms can be applied to the biomatrix by hosing the biomatrix, spraying the plants, or periodic soaking of the biomatrix.

The system can be installed indoors with the addition of an appropriate light system or out doors with natural sun light. The biomatrix can be seeded directly as is conventionally done with soil-based plants. The biomatrix system can also be pre-seeded, sprouted and placed into a vertical garden, as seasonal conditions permit.

In the present description, embodiments are directed to an apparatus comprising: a columnar support structure configured to be oriented vertically with respect to the ground; a motor coupled to the columnar support structure through a rotating shaft; and a stretchable grow media wrapped around the support structure in the vertical orientation, wherein the grow media comprises: a non-permeable, ultraviolet blocking backing layer, an activated carbon filter layer attached to the backing layer, one or more capillary biomats attached to the filter layer, and a front panel layer attached to an outer layer of the one or more capillary biomat layers, wherein the front panel layer and the one or more capillary biomat layers physically support the growth of one or more varieties of plants in a direction substantially perpendicular to the plane of the front panel layer, and distribute water to the roots of the plants through capillary action through the area of the grow media. The columnar support structure may be substantially circular or ovaloid in cross-section, or it may be polygonal in cross-section. In an embodiment, the support structure is coupled to a central pole attached to the rotating shaft, and wherein the central pole is constructed of a material selected from the group consisting of: steel, aluminum, plastic, wood, bamboo, and carbon fiber.

The apparatus may further comprise a reservoir holding the motor and an amount of water. The apparatus may also have a pump coupled to the reservoir to provide water to the grow media through a plumbing system, wherein the plumbing system is configured to draw water from the reservoir source through the grow media and back to the reservoir in substantially closed loop aquatic system. A sprinkler assembly coupled to the plumbing system and located proximate an upper portion of the grow media is also provided and configured to allow water to flow down onto the grow media. The apparatus may further comprise a control panel coupled to the motor and configured to allow a user to set a rate of rotation of the motor.

In an embodiment, the backing layer, filter layer, one or more capillary biomat layers, and the front panel layer of the grow media are attached to one another by attachment means selected from the group consisting of: glue, staples, rivets, and sewing, to form a flexible fabric biomatrix that is formed into a substantially rectangular shape of approximately one inch thick. The backing layer may comprise a marine vinyl material having a defined elasticity to facilitate stretching, and an opaque dark color configured to prevent ultraviolet radiation from penetrating a back surface of the backing layer, and to prevent water from penetrating a front surface of the backing layer, and wherein the one or more capillary biomat layers each comprise a fibrous mesh material configured to transport water via capillary action throughout the grow media, and further wherein the active carbon filter layer comprises a fabric layer containing activated charcoal, and further wherein the front panel layer comprises a porous structure made of polypropylene.

Embodiments of the grow media can be used in any type of closed-loop aquatic and closed-loop electrical system for growing plants comprising: a support structure, the biomatrix placed in the support structure in a substantially vertical orientation and supporting the growth of one or more varieties of plants, a water source coupled to the bio-mats through a pump and plumbing system, wherein the plumbing system is configured to draw water from the water source through the bio-mats and back to the water source in substantially closed loop aquatic system, and one or more power generation components generating power from non-electrical grid-based power sources, and a power storage system storing power generated by the power generation components and providing electrical energy to the pump and plumbing system to provide power in a substantially closed-loop electrical system. In this system, the plumbing system comprises one or more water pumps and filters, and the power generation circuits may include wind turbines, water turbines, solar panels, and human-powered generators.

Independent of any particular structure, embodiments are also directed to a method of growing plants comprising: providing a plurality of biomats in a substantially vertical orientation relative to the ground, seeding the biomats with plant matter, providing a water source coupled to the biomats through a pump and plumbing system, the water source including water enriched with nutrients and impurities, pumping enriched water through the biomats from the water source, filtering the enriched water from the biomats to produce clean water, and returning the clean water to the water source in a substantially closed-loop aquatic system.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the vertical aquaponic micro garden is not intended to be exhaustive or to limit the embodiments to the precise form or structures disclosed. While specific embodiments of, and examples for, the micro farm are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the location-based social network manager process in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the vertical aquaponic micro farm, according to an embodiment are presented below in certain claim forms, the inventor contemplates the various aspects of the methodology in any number of claim forms. Accordingly, the inventor reserves the right to add additional claims after filing the application to pursue such additional claim forms for other aspects of the described systems and methods.

What is claimed is:

1. An apparatus comprising:
   a columnar support structure configured to be oriented vertically with respect to the ground;
   a motor coupled to the columnar support structure through a rotating shaft; and
   a stretchable grow media wrapped around the support structure in the vertical orientation, wherein the grow media comprises:
   a non-permeable, ultraviolet blocking backing layer,
   an activated carbon filter layer attached to the backing layer,
   one or more capillary biomats attached to the filter layer, and
   a front panel layer attached to an outer layer of the one or more capillary biomat layers, wherein the front panel layer and the one or more capillary biomat layers physically support the growth of one or more varieties of plants in a direction substantially perpendicular to the plane of the front panel layer, and distribute water to the roots of the plants through capillary action through the area of the grow media.

2. The apparatus of claim 1 wherein the columnar support structure is one of substantially circular or ovaloid in cross-section.

3. The apparatus of claim 1 wherein the columnar support structure is polygonal in cross-section.

4. The apparatus of claim 2 wherein the support structure is coupled to a central pole attached to the rotating shaft, and wherein the central pole is constructed of a material selected from the group consisting of: steel, aluminum, plastic, wood, bamboo, and carbon fiber.

5. The apparatus of claim 1 further comprising a reservoir positioned at a bottom end of the support structure and holding the motor and an amount of water.

6. The apparatus of claim 1 further comprising a pump coupled to the reservoir to provide water to the grow media through a plumbing system, wherein the plumbing system is configured to draw water from the reservoir source through the grow media and back to the reservoir in substantially closed loop aquatic system.

7. The apparatus of claim 6 further comprising a sprinkler assembly coupled to the plumbing system and located at a top end of the support structure and proximate an upper portion of the grow media and configured to allow water to flow down onto the grow media.

8. The apparatus of claim 6 further comprising a control panel coupled to the motor and configured to allow a user to set a rate of rotation of the motor.

9. The apparatus of claim 1 wherein the backing layer, filter layer, one or more capillary biomat layers, and the front panel layer of the grow media are attached to one another by attachment means selected from the group consisting of: glue, staples, rivets, and sewing, to form a flexible fabric biomatrix that is formed into a substantially rectangular shape of approximately one inch thick.

10. The apparatus of claim 9 wherein the backing layer comprises a marine vinyl material having a defined elasticity to facilitate stretching, and an opaque dark color configured to prevent ultraviolet radiation from penetrating a back surface of the backing layer, and to prevent water from penetrating a front surface of the backing layer, and wherein the one or more capillary biomat layers each comprise a fibrous mesh material configured to transport water via capillary action throughout the grow media, and further wherein the active carbon filter layer comprises a fabric layer containing activated charcoal, and further wherein the front panel layer comprises a porous structure made of polypropylene.

11. A closed-loop, vertical garden system for growing plants comprising:
a water reservoir holding a volume of water;
a columnar support structure coupled to the water reservoir and oriented vertically with respect to a bottom plane of the water reservoir;
a composite, lightweight, stretchable grow media wrapped around the support structure, the grow media comprising a vinyl-based, non-permeable, ultraviolet blocking backing layer, wherein the backing layer has a defined elasticity to facilitate stretching, and an opaque dark color configured to prevent ultraviolet radiation from penetrating a back surface of the backing layer, and to prevent water from penetrating a front surface of the backing layer, an activated carbon filter layer attached to the backing layer, and one or more capillary biomats attached to the filter layer that physically support the growth of one or more varieties of plants and distribute water to the roots of the plants through capillary action through the area of the grow media, wherein the backing layer, filter layer, one or more capillary biomat layers, and the front panel layer, are configured to allow the formation of plant roots in an area proximate the front surface of the backing layer;
a motor assembly coupled to the support structure and configured to rotate the grow media at a defined turn rate; and
a pump and plumbing system, wherein the plumbing system is configured to draw water from the reservoir through the grow media and back to the water source in substantially closed loop aquatic system.

12. The system of claim 11 wherein the grow media further comprises a front panel layer attached to an outer layer of the one or more capillary biomat layers, the front panel layer comprising a porous structure made of polypropylene and configured to support the plants growing in a direction substantially perpendicular to the plane of the front surface of the front panel layer.

13. The system of claim 12 wherein the backing layer, filter layer, one or more capillary biomat layers, and the front panel layer of the grow media are attached to one another by attachment means selected from the group consisting of: glue, staples, rivets, and sewing.

14. The system of claim 13 wherein the one or more capillary biomat layers of the grow media each comprise a fibrous mesh material configured to transport water via capillary action throughout the grow media, and wherein the active carbon filter layer comprises a fabric layer containing activated charcoal.

15. The system of claim 14 wherein the columnar support structure is one of substantially circular, ovaloid, or polygonal in cross-section.

16. The system of claim 15 wherein the support structure is coupled to a central pole attached to the rotating shaft, and wherein the central pole is constructed of a material selected from the group consisting of: steel, aluminum, plastic, wood, bamboo, and carbon fiber.

17. The system of claim 13 further comprising a control panel allowing user control of the defined turn rate.

* * * * *